Patented June 27, 1950

2,512,631

UNITED STATES PATENT OFFICE 2,512,631

HYDRAZINE POLYMERS

James Wotherspoon Fisher and Edward William Wheatley, Spondon, near Derby, England, assignors to Celanese Corporation of America, a corporation of Delaware No Drawing. Application March 1, 1949, Serial No. 79,116. In Great Britain March 12, 1948

4 Claims. (Cl. 260—2)

This invention relates to improvements in the production of polymeric materials, and is more particularly concerned with the production of polymers suitable for the formation of filaments, films and plastic materials.

U. S. application S. No. 609,031 filed August 4, 1945 describes the production of nitrogen-containing polymers by heating dihydrazides of dicarboxylic acids in presence of hydrazine, e. g. 10% by weight of of the dihydrazide, over and above that combined in the dihydrazide, and also describes using dicarboxylic esters with an amount of hydrazine in excess of two moles for each mole of dicarboxylic acid. U. S. application S. No. 662,628 filed April 16, 1946 describes the production of such polymers from hydrazine and the dicarboxylic acids themselves or their anhydrides, again using more than two moles of hydrazine. Further, U. S. application S. No. 662,628 filed April 16, 1946 describes the production of nitrogen-containing polymers from mixtures of diamides and dihydrazides of dicarboxylic acids with free hydrazine, from dicarboxylic acids, esters or anhydrides with ammonia and hydrazine using more than two moles of total base including more than one mole of hydrazine, and from dinitriles of dicarboxylic acids with more than two moles of hydrazine. Polymers may be produced according to the processes of these specifications which possess characteristics, including resistance to degenerative hydrolysis by boiling hydrochloric acid, indicating that they contain the 1.2.4-triazole nucleus repeated along the main polymer chain. These polymers will be referred to in the present specification as polymers containing the 1.2.4-triazole nucleus. Polymers of high melting point and high nitrogen content approximating to the theoretical nitrogen content for the polymer containing the 4-amino-1.2.4-triazole nucleus repeated at intervals along the polymer chain, and linked together by the links derived from the dicarboxylic acid or derivative used as starting material, will be referred to as polymers containing the 4-amino-1.2.4-triazole nucleus.

When a dicarboxylic acid or derivative thereof is heated with an amount of hydrazine (combined with the dicarboxylic acid and/or free) from about 1-2 moles for each mole of dicarboxylic acid, nitrogen-containing polymers are produced which are hydrolysed by boiling hydrochloric acid so as to yield a hydrolysis product which has a much lower intrinsic viscosity than the original polymer, and indeed the hydrolysis product may consist substantially of monomeric material. Probably the links in such a polymer are largely or wholly of the hydrazide type—CO.NH.NHCO— or of the 1.3.4-oxdiazole type

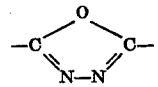

since both these types are broken down by boiling hydrochloric acid. We have now found that these polymers obtainable from dicarboxylic acids and hydrazine or their equivalent raw materials, which are subject to hydrolysis by boiling hydrochloric acid, may be further treated to produce polymers which are substantially resistant to degenerative hydrolysis by boiling hydrochloric acid. In particular, if such a polymer is heated with hydrazine under the general conditions indicated in the above U. S. applications S. Nos. 609,031 and 662,628, a polymer is obtainable which has a high nitrogen content, is resistant to hydrolysis by hydrochloric acid and is insoluble in methanol, thereby indicating that it is of the same character as the polymer which can be obtained by heating a dicarboxylic acid dihydrazide in presence of free hydrazine. Thus these polymers are probably poly-4-amino-1.2.4-triazoles.

As starting materials for the production of the hydrolysable polymers, any suitable dicarboxylic acids may be used, for example succinic acid, glutaric acid, adipic acid, pimelic acid, suberic acid, azelaic acid, sebacic acid and the higher dicarboxylic acids of this series, diphenic acid, p-phenylene diacetic acid and other dicarboxylic acids of the aromatic series. Sebacic acid is especially useful since it yields a final polymer having a melting point of the order of 250° C. which is very suitable for conversion to filaments by melt-spinning.

Instead of using hydrazine for the treatment of the hydrolysable polymers, other compounds containing the NH₂ group may be used, for example ammonia, primary amines, primary amides and the like. When the NH₂ group is attached to a carbon atom, the polymer obtained appears to be a 4-substituted poly-1.2.4-triazole, while when a mono-substituted hydrazine or N.N.-disubstituted hydrazine is used, the product appears to be a polysubstituted 4-amino-1.2.4-triazole. Thus the new process affords a method of obtaining poly-1.2.4-triazoles substituted at the 4-position with a variety of possible substituents. In this way the invention enables a wide range of polymers to be produced and allows for a very considerable variation in the melting point, moisture regain and other properties of the polymers. When ammonia is used, the product is probably a simple poly-1.2.4-triazole.

Broadly, therefore, the invention comprises the treatment with compounds of the general formula NH₂—R of polymers obtainable from dicarboxylic acids and hydrazine but which are hydrolysable, completely or substantially, by boiling hydrochloric acid.

As examples of compounds of the general formula NH₂—R, the following may be instanced:

1. Ammonia and hydrazine.
2. Primary amines, monosubstituted and asymmetric disubstituted hydrazines, for example compounds of the general formula NH₂.R₁ and

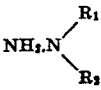

where R₁ may be an alkyl, aryl or aralkyl hydrocarbon radicle and R₂ may be hydrogen or an alkyl, aryl or aralkyl hydrocarbon radicle, for instance methylamine, ethylamine, a propylamine, a butylamine, aniline, a toluidine, a xylidine, the mono-methyl, ethyl and phenyl hydrazines and the asymmetric di-ethyl, methyl or phenyl hydrazines, N.N - methyl - phenyl-, N.N - ethyl - phenyl-, N.N-propyl - phenyl- and N.N - butyl - phenyl - hydrazines and N - aminopiperidine.

3. Primary amines and mono- and asymmetric disubstituted hydrazines where the substituent on the nitrogen atom consists of a hydrocarbon radicle containing a substituent, i. e. compounds of the formula NH₂.R₁ and

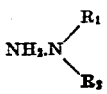

where R₁ is a substituted alkyl, aryl or aralkyl radicle and R₂ is hydrogen or a substituted or unsubstituted alkyl, aryl or aralkyl radicle, the substituent being, for example, a hydroxyl group, a nitrile group, a carboxy group or a carboxylic ester group. Examples of such compounds are ethanolamine, a propanolamine, a butanolamine, amino-pivalonitrile, ε-amino-capronitrile, glycine ester, amino-pivalic ester or ε-amino-caproic ester. Preferably in the case of amino acids or their derivatives, β-amino acids are not used except they be α.α-disubstituted, as for example in the amino-pivalic acid or its derivatives mentioned above. This limitation is because β-amino acids or their derivatives, except the α.α-disubstituted bodies, tend under the reaction conditions to split into a base and acrylic acid derivatives.

4. Acid amides and mono-acidyl hydrazines, N.N-diacidyl hydrazines or N-acidyl-N-alkyl, aryl or aralkyl hydrazines, i. e. compounds of the general formula NH₂.COR₁ and

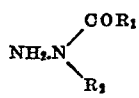

where R₁ has the same significance as in classes 2 and 3 above and R₂ has the same significance as in classes 2 and 3 or in addition R₂ may be —COR₁ where R₁ is defined as before, for example acetamide, propionamide, butyramide, benzamide, mono- or asymmetric di-acetyl hydrazine, propionyl hydrazine, benzoyl hydrazine, N-methyl-N-acetyl hydrazine, N-methyl-N-benzoyl hydrazine, N - phenyl - N - acetyl hydrazine and N-phenyl-N-benzoyl hydrazine.

5. If desired, compounds containing two or more NH₂ groups may be employed, and the linking groups may be of the character of R₁ and R₂ mentioned in classes 2 and 3 above but are di- or poly-valent radicles instead of being monovalent. In particular under this head, we instance diamines or diamides of the general formula NH₂R₄NH₂ where R₄ may be substituted or unsubstituted alkylene, arylene, aralkylene or di-acidyl, for example tetramethylene diamine, pentamethylene diamine, hexamethylene diamine, decamethylene diamine and the like, or meta- or para-phenylene diamine, or adipamide, suberamide or sebacamide. Such compounds containing two or more NH₂ groups are particularly designed to produce cross-linked polymers, i. e. polymers which are either water-insoluble and infusible or can be made insoluble and infusible by heat treatment. Generally for this purpose we prefer to use compounds having some considerable number of atoms joining the two or more NH₂ groups, as for example in hexamethylene diamine or higher polymethylene diamines.

6. Miscellaneous compounds, for example hydroxylamine, cyanamide, urea, thiourea, guanidine, semi-carbazide and derivatives thereof containing the NH₂ group, e. g. cyano-guanidine (di-cyandiamide), biuret, biguanide and melamine.

From the above list of compounds, it will be seen that the reaction is of very general applicability, and in consequence the invention enables a far wider range of polymers to be produced than can be produced by the processes of U. S. applications S. Nos. 609,031 and 662,628 with a consequent wider range of properties. Generally we prefer to treat the starting polymer, i. e. the hydrolysable polymer, with an excess of the compound containing the NH₂ group, so as to convert as many of the hydrolysable links into unhydrolysable triazole links as possible. However, the invention includes only partial conversion of such hydrolysable links, in which case the resulting polymers, while still being hydrolysable, suffer a much smaller loss in intrinsic viscosity on degenerative hydrolysis with boiling hydrochloric acid than the starting polymers.

As already indicated, the general conditions for carrying out the reaction are similar to those of U. S. application S. Nos. 609,031 and 662,628. For example, the reaction may generally be carried out at temperatures of the order of 150–300° C., and especially about 200-280° C., and may be carried out with the reagents, i. e. the polymer and the compound containing the NH₂ group, in the molten state, or the reagents may be suspended or dissolved in a suitable diluent, for example a cresol or a xylenol. Water is eliminated as a result of the reaction, but in as much as the reaction is irreversible, i. e. the resulting triazole links are not hydroylsable, it is not necessary to carry the reaction out or to complete the reaction under reduced pressure, as is usually the case with condensation polymers. However, if desired, the pressure may be reduced to below atmospheric pressure, particularly in the later stages. Generally it is preferred to heat the reagents together in a closed vessel under the autogenous pressure produced by the vapours of the reagent and/or solvent, and to release this pressure wholly or in part in the later stages of the reaction. In view of the fact that the reaction is irreversible, water may be used as a diluent and may or may not be allowed to escape, e. g. when the pressure is reduced. The presence of water is particularly advantageous when the compound used for reaction is hydrazine, which may be used in the form of hydrazine hydrate.

The invention may further be applied to polymers containing the above hydrolysable links, i. e. the hydrazide link —CO.NH.NH.CO— or the 1.3.4-oxdiazole link

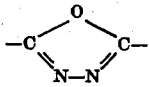

together with other linkages, and notably the carboxylic amide link. Thus, for example, a polymer may first be produced by condensing an amount of dicarboxylic acid with a substantially equivalent amount of a mixture of bases, including both a diamine, e. g. a polymethylene diamine, and hydrazine, and the resulting hydrolysable polymer may then be treated with hydrazine or other compound containing an $NH_2$ group as described above. Thus, for example, hexamethylene diammonium adipate and hydrazine adipate (one mole of hydrazine to one mole of adipic acid) may be co-condensed in any desired proportions, for example, one mole of the diammonium adipate to one mole of the hydrazine adipate up to five or more moles of the diammonium adipate to one mole of the hydrazine adipate. This polymerisation is preferably continued until a fibre-forming polymer is produced. The resulting polymer may then be heated in a closed autoclave with about an equal weight of aqueous 25% hydrazine, say for 2 hours at 150° C., and the polymer finished by heating under reduced pressure at a high temperature, say up to 230 or even 250° C. The resulting polymer is insoluble in methanol, soluble in cresol and formic acid, and has a nitrogen content consistent with the formation of aminotriazole linkages together with the calculated amount of simple carboxylic amide linkages.

In the above preparation, the hydrazine adipate containing one mole of hydrazine to one mole mole of adipic acid may be replaced by a composition containing between one and two moles of hydrazine to one mole of adipic acid. Further, the diamine and the adipic acid may respectively be replaced by other diamines and other dicarboxylic acids. Again, if desired, the hydrazine salt of the dicarboxylic acid or the composition containing between one and two moles of hydrazine to one mole of dicarboxylic acid may be polymerised alone and the product then heated together with a diamine salt of a dicarboxylic acid, or alternatively the diamine salt of the dicarboxylic acid may be pre-condensed and the product then heated with hydrazine adipate or other composition containing between one and two moles of hydrazine to one of dicarboxylic acid, or, as a still further alternative, both the diamine salt of the dicarboxylic acid and the composition containing the hydrazine and the dicarboxylic acid may be separately condensed and the two condensation products then condensed together to produce the starting polymer for treatment with a compound containing an $NH_2$ group in accordance with the invention.

By this means, co-polymers of the general character described in U. S. application S. No. 726,964 filed February 6, 1947 may be produced.

The invention further includes the production of filaments and fibres, films and the like from the polymers produced as described above. Generally the most suitable method of producing filaments is by melt spinning. The temperature of the melt should be some 10–30° above the melting point of the polymer, though this may be modified to some extent, e. g. by mixing the polymer with suitable proportions of plasticisers. Filaments may also be produced by dry or wet spinning processes from solutions in suitable solvents, for example formic acid or acetic acid or phenol, or, where they are soluble, in methanol or other lower alcohols. Generally in connection with filament formation, reference is made to the description in U. S. applications S. Nos. 609,031 and 662,628.

Further, as described in U. S. application S. No. 784,306 filed November 5, 1947, the polymers may be aftertreated with acylating agents or with aldehydes where they still contain hydrogen-carrying nitrogen atoms. Again, reference is made to the above specification for specific examples of such further treating agents. In treating with a polyfunctional aftertreating agent, it is desirable that the polymer should already have been brought into its desired form, for example into the form of a filament, fibre or film. This preference also applies to the broad process of the invention where the treating agent containing the $NH_2$ group is of the type which leads to cross-linking, i. e. the agent contains two or more $NH_2$ groups. In such a case the starting polymer, i. e. the hydrolysable polymer, may be spun into filaments, films or the like, and such a product impregnated with the treating agent and subsequently baked, or alternatively the spinning solution or melt may already contain the treating agent and the filaments, films or the like produced therefrom may be afterwards baked to bring about or complete the cross-linking reaction.

The following examples illustrate the invention:

EXAMPLE 1

*Preparation of hydrolysable polymer*

100 parts of mono-hydrazine sebacate (1 mole hydrazine to 1 mole sebacic acid) were heated under nitrogen for 1 hour at 200° C. and then for a further 3 hours hours at 240° C. and an absolute pressure of .2 mms. of mercury. The product was a brittle solid melting at 295–300° C. and on analysis showed a nitrogen content of 12.8%. It was insoluble in water, acetone, methanol and cold meta-cresol. The loss in weight was 18.12 parts compared with a theoretical loss of 15.38 for a polymer containing hydrazide links —CO.NH.NH.CO— alone, and 23.08 parts for a polymer containing 1.3.4-oxdiazole links alone. On boiling for 5 hours with 20% hydrochloric acid, substantial quantities of sebacic acid and hydrazine were set free and no oily hydrochloride was formed such as is formed on boiling with hydrochloric acid the polymers from sebacic acid described in U. S. applications S. Nos. 609,031 and 662,628.

EXAMPLE 2

*Treatment of the hydrolysable polymer with hydrazine*

20 parts of the polymer prepared according to Example 1 were heated in an autoclave for 2 hours with 30 parts of 24% aqueous hydrazine hydrate at 220° C. The pressure reached was 300 lbs. per square inch. The product was a white mass melting at 250–255° C. and had good fibre-forming properties. Its nitrogen content was 26.4%, and the polymer was insoluble in methanol and in acetone and soluble in cold meta-cresol and in formic acid. It resembled very closely the polymers from sebacic acid described in the examples of U. S. application S. No. 609,031 and in Examples III and IV of U. S. application S. No. 662,628, and in common with those polymers was not hydrolysed by hydrochloric acid but yielded an oily hydrochloride which on regeneration gave a polymer of substantially the same properties.

EXAMPLE 3

20 parts of the polymer prepared according to Example 1 were heated in an autoclave with 17.6 parts of 880 aqueous ammonia first for 2 hours at 220° C. and then for 1½ hours at 260° C., at which temperature the pressure indicated was 650 lbs. per square inch. The pressure was then released down to 120 lbs. over a period of ¾ hour, the temperature being maintained at 260° C. The product was a tough mass with good fibre-forming properties. It was purified by dissolving in 50/50 methanol/chloroform and precipitating into acetone. The purified product melted at 146–148° C., was slightly soluble in methanol, was soluble in methanol/chloroform and in meta-cresol and formic acid. The polymer was not hydrolysed by hydrochloric acid but yielded an oily hydrochloride from which by regeneration a polymer was re-formed having a melting point of 158–162° C. and a nitrogen content of 20.5%.

In the above examples, all the parts given are by weight.

Having described our invention, what we desire to secure by Letters Patent is:

1. Process for improving the properties of a preformed linear polymer obtained by heating a reaction mixture, which reaction mixture on complete hydrolysis yields a dicarboxylic acid free from reactive groups other than the carboxy groups and from 1 to 2 moles of hydrazine for each mole of dicarboxylic acid, which polymer suffers a substantial loss in intrinsic viscosity on hydrolysis with hydrochloric acid, which comprises heating the said polymer with an inorganic base selected from the group consisting of hydrazine and ammonia, and continuing the heating to produce a polymer resistant to hydrolysis by hydrochloric acid.

2. Process for improving the properties of a preformed linear polymer obtained by heating a reaction mixture, which reaction mixture on complete hydrolysis yields a dicarboxylic acid free from reactive groups other than the carboxy groups and from 1 to 2 moles of hydrazine for each mole of dicarboxylic acid, which polymer suffers a substantial loss in intrinsic viscosity on hydrolysis with hydrochloric acid, which comprises heating the said polymer with aqueous hydrazine, and continuing the heating to produce a polymer resistant to hydrolysis by hydrochloric acid.

3. Process for improving the properties of a preformed linear polymer obtained by heating a reaction mixture, which reaction mixture on complete hydrolysis yields a dicarboxylic acid free from reactive groups other than the carboxy groups and from 1 to 2 moles of hydrazine for each mole of dicarboxylic acid, which polymer suffers a substantial loss in intrinsic viscosity on hydrolysis with hydrochloric acid, which comprises heating the said polymer with a further quantity of hydrazine, and continuing the heating to produce a polymer resistant to hydrolysis by hydrochloric acid.

4. Process for improving the properties of a preformed linear polymer obtained by heating a reaction mixture, which reaction mixture on complete hydrolysis yields sebacic acid and from 1 to 2 moles of hydrazine for each mole of sebacic acid, which polymer suffers a substantial loss in intrinsic viscosity on hydrolysis with hydrochloric acid, which comprises heating the said polymer with aqueous hydrazine, and continuing the heating to produce a polymer resistant to hydrolysis by hydrochloric acid.

JAMES WOTHERSPOON FISHER.
EDWARD WILLIAM WHEATLEY.

REFERENCES CITED

The following references are of record in the file of this patent:

UNITED STATES PATENTS

| Number | Name | Date |
| --- | --- | --- |
| 2,395,642 | Prichard | Feb. 26, 1946 |

FOREIGN PATENTS

| Number | Country | Date |
| --- | --- | --- |
| 879,078 | France | Feb. 12, 1943 |
| 884,794 | France | Aug. 26, 1943 |